(No Model.)
J. F. PRUDEN.
CUP HEAD OR PISTON PACKING.
No. 526,053.  Patented Sept. 18, 1894.
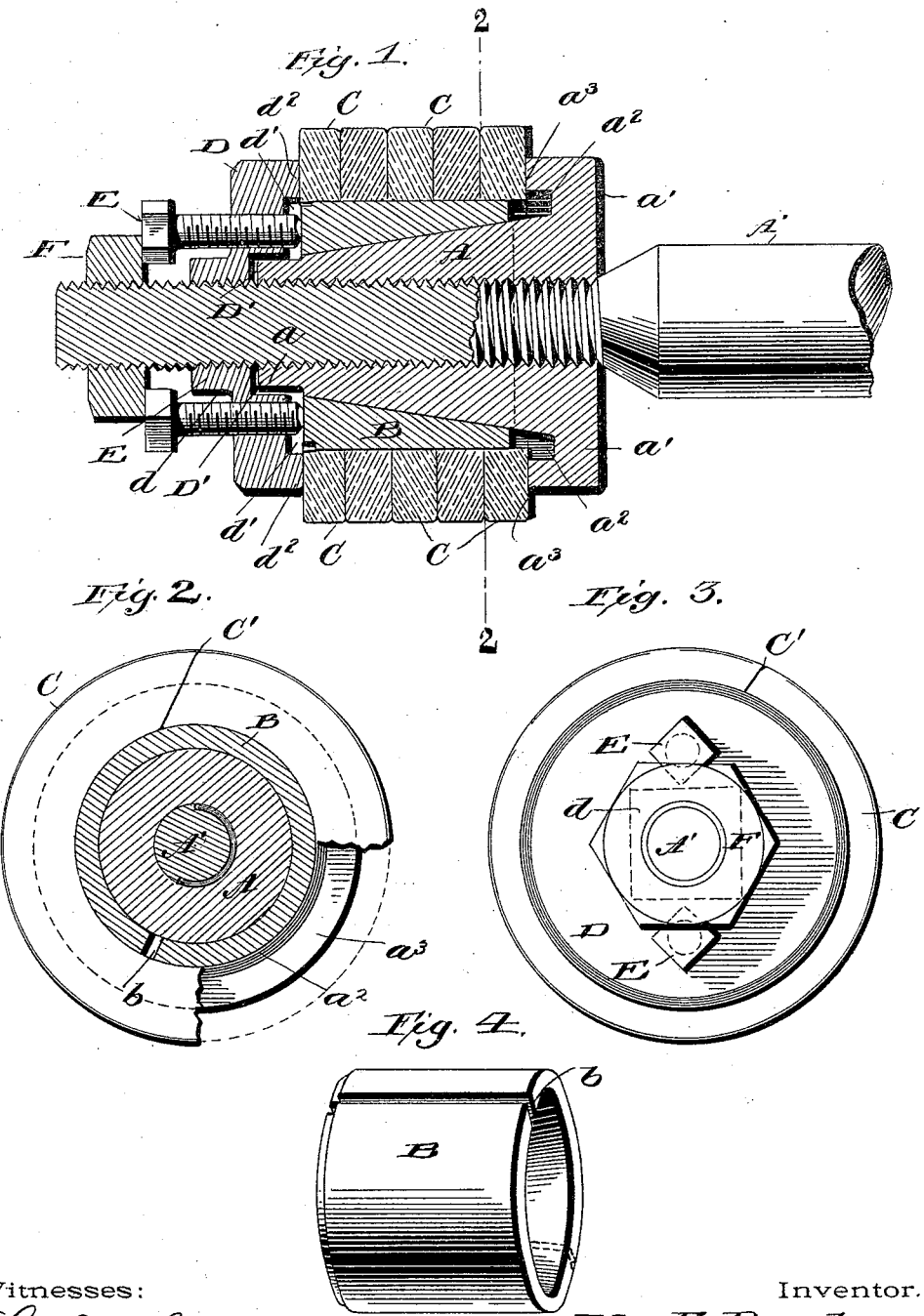
Witnesses:
L. C. Hills
E. H. Bond
Inventor.
John F. Pruden,
by E. B. Lowering
Attorney.

UNITED STATES PATENT OFFICE.

JOHN F. PRUDEN, OF OAKDALE STATION, PENNSYLVANIA.

CUP-HEAD OR PISTON-PACKING.

SPECIFICATION forming part of Letters Patent No. 526,053, dated September 18, 1894.

Application filed March 15, 1894. Serial No. 503,758. (No model.)

*To all whom it may concern:*

Be it known that I, JOHN F. PRUDEN, a citizen of the United States, residing at Oakdale Station, in the county of Allegheny, State of Pennsylvania, have invented certain new and useful Improvements in Cup-Heads or Piston-Packing, of which the following is a specification, reference being had therein to the accompanying drawings.

This invention relates to certain new and useful improvements in cup-heads or piston-packing for any and all forms of pumps and the like where such device is employed.

It has for its object among others to provide a simple and cheap construction by which the packing rings can be adjusted as occasioned by wear, and the parts composing the same readily assembled or detached when it becomes necessary to replace any of them. I employ a conical body portion with a screw-threaded bore and a socketed flange at its larger end, with a tapered adjusting sleeve, in one or more parts, fitted to the conical body portion and against which the packing rings are sleeved, a cap-piece being employed through which pass adjusting screws to adjust the tapered sleeve to force the packing rings outward. The piston rod passes through the body portion and cap and receives a nut which bears upon the heads of the adjusting screws to hold the parts together and prevent loosening of the said screws.

Other objects and advantages of the invention will hereinafter appear and the novel features thereof will be specifically defined by the appended claims.

The invention is clearly illustrated in the accompanying drawings, which, with the letters of reference marked thereon, form a part of this specification, and in which—

Figure 1 is a substantially central longitudinal section through my piston-head or cup-head with a portion of the piston rod shown broken away and in elevation. Fig. 2 is a cross section on the line 2—2 of Fig. 1 with one of the packing rings broken away. Fig. 3 is an end elevation. Fig. 4 is a view of the tapered adjusting sleeve detached from the other parts.

Like letters of reference indicate like parts throughout the several views.

Referring now to the details of the drawings by letter, A designates the body portion which is conical in form with a central longitudinal bore which is screw-threaded to receive the threaded end of the piston rod A'. The smaller end of the conical part of the body portion terminates in a parallel-walled boss or extension $a$ as seen best in Fig. 1 while the other end of this body portion has an annular enlargement $a'$ which is provided with a socket or annular recess $a^2$ as shown best in Fig. 1 into which the end of the tapered sleeve may be forced as the latter is adjusted to throw the packing rings outward.

B is a tapered sleeve split lengthwise thereof as seen at $b$ in Figs. 2 and 4 and this sleeve is fitted over the conical part of the body portion as seen in Figs. 1 and 2 and around this sleeve are placed the packing rings C which may be of any suitable material and construction, being split as seen at C', the innermost one bearing against the shoulder or face $a^3$ of the enlargement $a'$ of the body portion as seen in Fig. 1.

D is a cap-piece preferably of the same diameter as the enlargement of the body portion as seen in Fig. 1 and having a central boss $d$ which is screw threaded to receive the threaded portion of the piston rod as shown in Fig. 1, and upon its inner face formed with a recess or chamber D' to receive the boss or extension $a$ of the conical part of the body portion. This serves to prevent undue movement of the cap piece with relation to the body portion. The inner face of the cap-piece is also provided with a recess $d'$ as seen in Fig. 1 so that only the flange $d^2$ around the outer edge of the said cap-piece bears upon the outer face of the outer packing ring, and through the cap-piece are threaded the adjusting screws E which are adapted to bear against the outer end of the tapered adjusting sleeve as seen in Fig. 1.

F is a nut of the end of the piston rod which projects beyond the cap-piece and which nut bears against the heads of the adjusting screws as shown in Figs. 1 and 3.

The tapered sleeve B may be in more than one part if desired. It is shown by dotted lines as divided longitudinally in Fig. 4.

Any suitable form of lock-nut device may be employed if found necessary to keep the nut F locked and to prevent its becoming loose.

Modifications in detail may be resorted to without departing from the spirit of the invention or sacrificing any of its advantages.

What I claim as new is—

1. The combination with the conical body portion with enlargement and socket, of the tapered split sleeve embracing the conical portion, the split packing rings around the sleeve, the cap-piece, and the adjusting screws passed therethrough and bearing against the end of the sleeve, as set forth.

2. The combination with the conical body portion, of the tapered split sleeve, the cap-piece, the piston rod threaded into the body portion and cap-piece, and the adjusting screws passed through the cap-piece and bearing against the sleeve and a nut on the rod engaging the heads of the screws, substantially as specified.

3. The combination with the conical body portion, of the tapered split sleeve, the cap-piece, the piston rod threaded into the body portion and cap-piece, the adjusting screws passed through the cap-piece, and the nut on the end of the piston rod bearing upon the ends of the adjusting screws, substantially as specified.

4. The combination with the body portion having bored and screw-threaded conical portion, boss and enlargement with socket, of the tapered split sleeve encircling the conical portion, the packing rings around the sleeve, the cap-piece with threaded extension, and socket, the threaded piston rod, the adjusting screws passed through the cap-piece and bearing upon the sleeve, and the nut on the end of the piston rod and bearing upon the ends of said screws, all substantially as specified.

In testimony whereof I affix my signature in presence of two witnesses.

JOHN F. PRUDEN.

Witnesses:
D. R. RODGERS,
C. M. STAIGERS.